United States Patent [19]

Goldstein et al.

[11] Patent Number: 4,809,300

[45] Date of Patent: Feb. 28, 1989

[54] BRANCH METRIC ALGORITHM FOR EIGHT-DIMENSIONAL SIGNAL CONSTELLATION

[75] Inventors: Yuri Goldstein, Southbury; William E. Abdelsayed, Wolcott; Paul D. Cole, Fairfield, all of Conn.

[73] Assignee: General DataComm, Inc., Middlebury, Conn.

[21] Appl. No.: 177,638

[22] Filed: Apr. 5, 1988

[51] Int. Cl.$^4$ .................... H04L 23/02; H04L 27/06
[52] U.S. Cl. ........................... 375/94; 375/39; 375/27; 371/43
[58] Field of Search ............... 375/27, 39, 94; 371/37, 371/43

[56] References Cited

U.S. PATENT DOCUMENTS 4,713,817 12/1987 Wei ........................................ 375/39
4,761,784 8/1988 Srinivasagopalan et al. ........ 371/43

Primary Examiner—Benedict V. Safourek
Assistant Examiner—Marianne Huseman
Attorney, Agent, or Firm—David P. Gordon

[57] ABSTRACT

A method is disclosed for determining with only sixty-four distance comparisons the distances between a received eight-dimensional vector comprised of four two-dimensional coordinates and each of sixteen non-overlapping subconstellations. In order to limit the comparisons, each subconstellation is represented by a collection of sixteen representational four-coordinate vectors, with each collection having four groups of vectors of the form

| (a,     | b,     | c,     | d)     |
| (a + 2, | b + 2, | c,     | d)     |
| (a,     | b,     | c + 2, | d + 2) |
| (a + 2, | b + 2, | c + 2, | d + 2) | where each letter represents in a different plane one of a set of points T(0) and its ninety, one hundred and eighty, and two hundred and seventy degree rotations, and +2 represents a one hundred and eighty degree rotation. Knowing the distance between each coordinate of the received vector and each set of points, if the received vector is broken into two two-coordinate vectors, eight comparisons may be made to find the eight shortest combinations of the two-coordinate representative vectors for the first two planes, and eight additional comparisons for the second two planes. By combining the two groups of two-coordinate shorter vectors, sixty-four combinations are found for the sixteen collections of four-coordinate representational vectors; four for each collection. Three comparisons for each group may then be made for each subconstellation to find the representational vector representing the four-coodinate (eight-dimensional) point closest to the received vector.

17 Claims, 1 Drawing Sheet

BRANCH METRIC ALGORITHM FOR EIGHT-DIMENSIONAL SIGNAL CONSTELLATION

BACKGROUND

This invention relates to a method for determining the identities of points received by the receiver section of a high speed modem used in data communiction. More particularly, this invention relates branch metric algorithms for determining the distances between signals representing eight-dimensional points and each of a plurality of eight-dimensional subconstellations.

It has been well known in the art for some time to utilize limited frequency band channels for the transmission of data over telephone voice lines. Recently, the technology has advanced to the point where transmission of data at 14,000 and even 19,200 bits of data per second is accomplishable. In providing such high data rates it has been necessary to increase the number of points in a transmitted constellation which maintaining the same maximum average power. However, because such an increase in the number of constellation points with an identical power is accompanied by the necessity that the points become closer to one another, it has likewise become necessary to separate the constellation into subconstellations where each point of a particular subconstellation is a greater distance apart from another point in that subconstellation than from other points in other subconstellations. Such an arrangement is preferred for accomplishing the trellis encoding of the transmitted points. Trellis encoding provides redundant data bits which are used to correct errors in the received signals and hence provide a gain in the signal to noise ratio of the received data signals.

Branch metric algorithms for calculating the branch metric corresponding to each point of a signal are known in the art. An example of a branch metric algorithm for a constellation with two-dimensional points may be seen with reference to U.S. Pat. No. 4,709,377 to Martinez et al. A branch metric algorithm for an eight-dimensional constellation having sixteen subconstellations of eight-dimensional points (i.e. four planes of two-dimensional points) is also known and comprises: for each received two-dimensional coordinate of an eight-dimensional vector, determining the distances between the received coordinate and a set of points in a two-dimensional plane, and between the received coordinate and non-overlapping sets of points generated by ninety, one hundred eighty and two hundred seventy degree rotations of the first set of points as inputs; providing sixteen non-overlapping subconstellations each represented by a collection of sixteen representational four-coordinate vectors, wherein the i'th coordinate of the four-coordinate representational vector represents one of said four non-overlapping sets of points in the i'th plane; for each collection of sixteen representational vectors, finding the distance between the received four-coordinate vector and the set of vectors represented by the collection of the sixteen representational four-coordinate vectors; and for each subconstellation represented by a collection of sixteen representational vectors, comparing among the distances between the received vector and each of the vectors represented by the representational vectors to find for that collection the representational vector that represents a vector having the shortest distance to the received vector. With the known branch metric algorithm having sixteen subconstellations each represented by sixteen representational vectors, a total of two hundred and forty comparisons (fifteen comparisons times the sixteen subconstellations) must be made to find the distance between the received vector and each of the sixteen subconstellations.

While the branch metric algorithm requiring two hundred and forty comparisons will provide desired results, it should be appreciated that considerable processing power must be provided to accomplish the comparisons in an extremely quick fashion for high speed modems. In fact, unless numerous processors or a dedicated especially arranged digital signal processor were provided, such a task would appear impossible. However, it will also be appreciated that the use of multiple processors, or the development of a special digital signal processor for accomplishing the comparison task are both undesirable.

SUMMARY OF THE INVENTION

It is therefore an object of the invention to provide a branch metric algorithm for determining indications of distances between a received eight-dimensional point and the eight-dimensional points in each of a plurality of subconstellations.

It is a further object of the invention to provide a branch metric algorithm for eight-dimensional points which uses many fewer distance comparisons than the eight-dimensional point branch metric algorithms of the art.

In accord with the objects of the invention, a method is provided for determining indications of the distances between a received eight-dimensional vector comprised of four two-dimensional coordinates and each of sixteen non-overlapping subconstellations. The preferred method generally comprises:

(a) obtaining indications of distances between each of the two-dimensional coordinates of said received vector and a first set of points in a two-dimensional plane, and between each of the two-dimensional coordinates of the received vector and non-overlapping second, third, and fourth sets of points generated by ninety, one hundred eighty and two hundred seventy degree rotations of said first set of points, wherein each of the sixteen non-overlapping subconstellations is represented by a collection of sixteen representational four-coordinate vectors, wherein an i'th coordinate of one of the four-coordinate representational vectors represents one of the four non-overlapping sets of points in an i'th plane, and wherein for any representational four-coordinate vector representing a particular subconstellation, those representational vectors which represent one hundred and eighty degree rotations in a first and second two-dimensional coordinate and zero rotation in a third and fourth two-dimensional coordinate, zero rotation in the first and second two-dimensional coordinate and one hundred eighty degree rotation in the third and fourth two-dimensional coordinates, and one hundred eighty degree rotation in all four two-dimensional coordinates are also representative of the same particular subconstellation;

(b) using the obtained indications of distance for said two-dimensional coordinates to find an indication of distance between a first four-dimensional vector consisting of the first two two-dimensional coordinates of the received eight-dimensional vector and each of sixteen four-dimensional sets of points represented by sixteen two-coordinate representational vectors wherein a first coordinate represents one of the nonoverlapping sets of points in a first two-dimensional plane and wherein a second coordinate represents one of the nonoverlapping sets of points in a second two-dimensional plane, and obtaining by comparison the smaller of the two distance indications in each of eight pairs of distance indications to obtain a first group of eight shorter distances, each pair comprising the distance indication between the first four-dimensional vector and a particular four-dimensional set of points and the distance indication between the first four-dimensional vector and a set of four-dimensional points which is the hundred-eighty degree rotation of that particular four-dimensional set of points;

(c) using the obtained indications of distance for the two-dimensional coordinates to find an indication of distance between a second four-dimensional vector consisting of the second two two-dimensional coordinates of the received eight-dimensional vector and each of a second collection of sixteen four-dimensional sets of points represented by a second collection of sixteen two-coordinate representational vectors wherein a first coordinate of the second four-dimensional vector represents one of the nonoverlapping sets of points in a third two-dimensional plane and wherein a second coordinate of the second four-dimensional vector represents one of the nonoverlapping sets of points in a fourth two-dimensional plane, and obtaining by comparison the smaller of the two distance indications in each of a second group of eight pairs of distance indications to obtain a second group of eight shorter distances, each pair comprising the distance indication between the second four-dimensional vector and a second particular four-dimensional set of points of the second collection and the distance indication between the second four-dimensional vector and a set of four-dimensional points which is the hundred-eighty degree rotation of the second particular four-dimensional set of points of the second collection;

(d) for each said collection of sixteen four-coordinate representational vectors, finding four representational four-coordinate vectors comprised of a combination of first and second two-dimensional coordinates from the first group of shorter distance indications, and third and fourth two-dimensional coordinates from the second group of shorter distance indications; and (e) for each said collection of sixteen four-coordinate representational vectors, comparing among four distance indications from said received vector to the eight-dimensional set of subconstellation points represented by each of said four found four-coordinate representational vectors, to determine a shortest distance indication between said received vector and each subconstellation.

In carrying out the preferred method, it will be appreciated that only sixty-four comparisons need be conducted; eight comparisons are made to determine the shortest distance for the first two coordinates; eight comparisons are made to determine the shortest distance for the latter two coordinates; and three comparisons are made for each of the sixteen subconstellations to determine which of the four combinations of four-coordinate representational vectors represents a vector which has the shortest distance to the received vector for that subconstellation.

In the preferred embodiment, each distance indication is a squared Euclidean distance, and every distance indication which is obtained in more than one plane is obtained by adding the squared Euclidean distances found in each of the relevant planes. Also, in the preferred embodiment, one set of representational four-coordinate vectors is a closed set under addition and subtraction. The preferred closed set is:

| (0,0,0,0) | (1,1,1,1) | (0,2,0,2) | (1,3,1,3) |
| (2,2,0,0) | (3,3,1,1) | (2,0,0,2) | (3,1,1,3) |
| (0,0,2,2) | (1,1,3,3) | (0,2,2,0) | (1,3,3,1) |
| (2,2,2,2) | (3,3,3,3) | (2,0,2,0) | (3,1,3,1) |

A better understanding of the invention, and additional advantages and objects of the invention will become apparent to those skilled in the art upon reference to the detailed description and the accompanying drawing.

DETAILED DESCRIPTION OF THE PREFERRED EMBODIMENT

Figure 1:
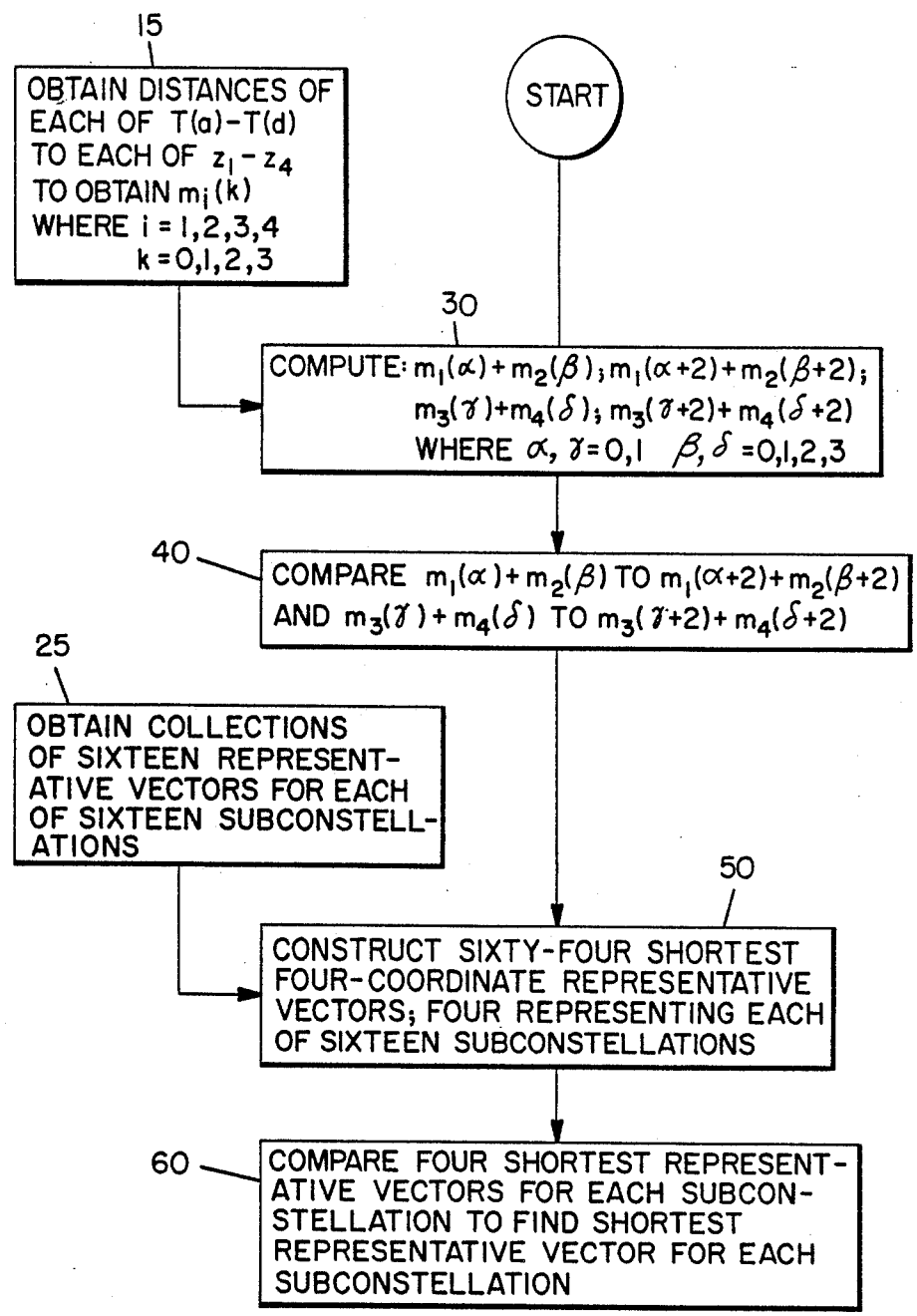
FIG. 1 is a block diagram of the preferred branch metric algorithm of the invention.

Before turning to FIG. 1, an understanding of the mathematics underlying the invention is in order. Thus, starting with a set of points T(0) in a plane, three additional sets of points T(1), T(2), and T(3) may be obtained by rotating the points in set T(0) by ninety degrees, one hundred-eighty degrees, and two hundred-seventy degrees respectively. For purposes of the invention, the only restriction on the set of points T(0) is that in rotating the points in the afore-described manner, none of the sets T(0), T(1), T(2), and T(3) should overlap; i.e. the sets are exclusive of each other. The union of sets T(0)–T(3) is then seen to comprise a collection of two-dimensional signal points S, and an eight-dimensional signal constellation C may be constructed as a cartesian product $C = S \times S \times S \times S$. Each element of the eight-dimensional constellation C is a four-coordinate (eight dimensional) vector denoted as $(s_1, s_2, s_3, s_4)$, where each of $s_1$ through $s_4$ is a two-dimensional point taken from S.

The signal constellation C may be said to be broken into a plurality (preferably sixteen) subconstellations such that each subconstellation is the union of sixteen of the sets $T(a) \times T(b) \times T(c) \times T(d)$ where a, b, c, and d may equal any value from zero to three inclusive, and $T(a) \times T(b) \times T(c) \times T(d)$ consists of those signal vectors $(s_1, s_2, s_3, s_4)$ for which $s_1$ is in T(a), $s_2$ is in T(b), $s_3$ is in T(c), and $s_4$ is in T(d). Thus with two hundred fifty-six sets $T(a) \times T(b) \times T(c) \times T(d)$, it will be appreciated that any signal vector in constellation C is in exactly one of the sets, and hence in exactly one subconstellation.

Setting W to represent a set of vectors (a,b,c,d) where a, b, c, and d may equal zero to three inclusive, the sixteen subconstellations may be represented by collections of representational vectors in W, where the vector (a,b,c,d) represents $T(a) \times T(b) \times T(c) \times T(d)$. In accord with the preferred embodiment of the invention, a first collection G of four-coordinate (eight-dimensional) representational vectors is chosen as follows:

| (0,0,0,0) | (1,1,1,1) | (0,2,0,2) | (1,3,1,3) |
| (2,2,0,0) | (3,3,1,1) | (2,0,0,2) | (3,1,1,3) |

-continued

| | | | |
|---|---|---|---|
| (0,0,2,2) | (1,1,3,3) | (0,2,2,0) | (1,3,3,1) |
| (2,2,2,2) | (3,3,3,3) | (2,0,2,0) | (3,1,3,1) |

It will be appreciated that the first set G listed above is closed (in mod four) under both addition and subtraction; i.e. p+q and p−q are in G if p and q are representational vectors in G. It will also be appreciated that each column of representational vectors listed above has a first (representational) vector followed by: a second vector which has its first and second coordinates offset by two (representing points rotated by one hundred and eighty degrees) and its third and four coordinates unchanged (representing points not rotated); a third vector having its first and second coordinates unchanged and its third and fourth coordinates offset by two; and a fourth vector having all four coordinates offset by two. By choosing collection G to have one of the vectors (0,0,0,0), (1,1,1,1), (0,2,0,2) and (1,3,1,3) in each column, G is closed both under addition and subtraction is obtained.

Fifteen additional collection in W may be obtained by first selecting a vector in W and then adding the selected vector to each of the vectors in collection G. Those skilled in the art will recognize that the resulting collections, as well as G itself, as the cosets of the subgroup G in the group W. It will be appreciated that the fifteen additional cosets may be generated by adding the following vectors to G: (1,0,0,0), (0,1,0,0), (0,0,1,0), (0,0,0,1), (3,0,0,0), (0,3,0,0), (0,0,3,0), (0,0,0,3), (1,1,0,0), (1,0,1,0), (1,0,0,1), (3,1,0,0), (3,0,1,0), (3,0,0,1), (2,0,0,0). In adding the listed vectors, the following cosets, each consisting of a collection of sixteen representational vectors are generated:

| | | | |
|---|---|---|---|
| (1,0,0,0) | (2,1,1,1) | (1,2,0,2) | (2,3,1,3) |
| (3,2,0,0) | (0,3,1,1) | (3,0,0,2) | (0,1,1,3) |
| (1,0,2,2) | (2,1,3,3) | (1,2,2,0) | (2,3,3,1) |
| (3,2,2,2) | (0,3,3,3) | (3,0,2,0) | (0,1,3,1) |
| (0,1,0,0) | (1,2,1,1) | (0,3,0,2) | (1,0,1,3) |
| (2,3,0,0) | (3,0,1,1) | (2,1,0,2) | (3,2,1,3) |
| (0,1,2,2) | (1,2,3,3) | (0,3,2,0) | (1,0,3,1) |
| (2,3,2,2) | (3,0,3,3) | (2,1,2,0) | (3,2,3,1) |
| (0,0,1,0) | (1,1,2,1) | (0,2,1,2) | (1,3,2,3) |
| (2,2,1,0) | (3,3,2,1) | (2,0,1,2) | (3,1,2,3) |
| (0,0,3,2) | (1,1,0,3) | (0,2,3,0) | (1,3,0,1) |
| (2,2,3,2) | (3,3,0,3) | (2,0,3,0) | (3,1,0,1) |
| (0,0,0,1) | (1,1,1,2) | (0,2,0,3) | (1,3,1,0) |
| (2,2,0,1) | (3,3,1,2) | (2,0,0,3) | (3,1,1,0) |
| (0,0,2,3) | (1,1,3,0) | (0,2,2,1) | (1,3,3,2) |
| (2,2,2,3) | (3,3,3,0) | (2,0,2,1) | (3,1,3,2) |
| (3,0,0,0) | (0,1,1,1) | (3,2,0,2) | (0,3,1,3) |
| (1,2,0,0) | (2,3,1,1) | (1,0,0,2) | (2,1,1,3) |
| (3,0,2,2) | (0,1,3,3) | (3,2,2,0) | (0,3,3,1) |
| (1,2,2,2) | (2,3,3,3) | (1,0,2,0) | (2,1,3,1) |
| (0,3,0,0) | (1,0,1,1) | (0,1,0,2) | (1,2,1,3) |
| (2,1,0,0) | (3,2,1,1) | (2,3,0,2) | (3,0,1,3) |
| (0,3,2,2) | (1,0,3,3) | (0,1,2,0) | (1,2,3,1) |
| (2,1,2,2) | (3,2,3,3) | (2,3,2,0) | (3,0,3,1) |
| (0,0,3,0) | (1,1,0,1) | (0,2,3,2) | (1,3,0,3) |
| (2,2,3,0) | (3,3,0,1) | (2,0,3,2) | (3,1,0,3) |
| (0,0,1,2) | (1,1,2,3) | (0,2,1,0) | (1,3,2,1) |
| (2,2,1,2) | (3,3,2,3) | (2,0,1,0) | (3,1,2,1) |
| (0,0,0,3) | (1,1,1,0) | (0,2,0,1) | (1,3,1,2) |
| (2,2,0,3) | (3,3,1,0) | (2,0,0,1) | (3,1,1,2) |
| (0,0,2,1) | (1,1,3,2) | (0,2,2,3) | (1,3,3,0) |
| (2,2,2,1) | (3,3,3,2) | (2,0,2,3) | (3,1,3,0) |
| (1,1,0,0) | (2,2,1,1) | (1,3,0,2) | (2,0,1,3) |
| (3,3,0,0) | (0,0,1,1) | (3,1,0,2) | (0,2,1,3) |
| (1,1,2,2) | (2,2,3,3) | (1,3,2,0) | (2,0,3,1) |
| (3,3,2,2) | (0,0,3,3) | (3,1,2,0) | (0,2,3,1) |
| (1,0,1,0) | (2,1,2,1) | (1,2,1,2) | (2,3,2,3) |
| (3,2,1,0) | (0,3,2,1) | (3,0,1,2) | (0,1,2,3) |
| (1,0,3,2) | (2,1,0,3) | (1,2,3,0) | (2,3,0,1) |
| (3,2,3,2) | (0,3,0,3) | (3,0,3,0) | (0,1,0,1) |
| (1,0,0,1) | (2,1,1,2) | (1,2,0,3) | (2,3,1,0) |
| (3,2,0,1) | (0,3,1,2) | (3,0,0,3) | (0,1,1,0) |
| (1,0,2,3) | (2,1,3,0) | (1,2,2,1) | (2,3,3,2) |
| (3,2,2,3) | (0,3,3,0) | (3,0,2,1) | (0,1,3,2) |
| (3,1,0,0) | (0,2,1,1) | (3,3,0,2) | (0,0,1,3) |
| (1,3,0,0) | (2,0,1,1) | (1,1,0,2) | (2,2,1,3) |
| (3,1,2,2) | (0,2,3,3) | (3,3,2,0) | (0,0,3,1) |
| (1,3,2,2) | (2,0,3,3) | (1,1,2,0) | (2,2,3,1) |
| (3,0,1,0) | (0,1,2,1) | (3,2,1,2) | (0,3,2,3) |
| (1,2,1,0) | (2,3,2,1) | (1,0,1,2) | (2,1,2,3) |
| (3,0,3,2) | (0,1,0,3) | (3,2,3,0) | (0,3,0,1) |
| (1,2,3,2) | (2,3,0,3) | (1,0,3,0) | (2,1,0,1) |
| (3,0,0,1) | (0,1,1,2) | (3,2,0,3) | (0,3,1,0) |
| (1,2,0,1) | (2,3,1,2) | (1,0,0,3) | (2,1,1,0) |
| (3,0,2,3) | (0,1,3,0) | (3,2,2,1) | (0,3,3,2) |
| (1,2,2,3) | (2,3,3,0) | (1,0,2,1) | (2,1,3,2) |
| (2,0,0,0) | (3,1,1,1) | (2,2,0,2) | (3,3,1,3) |
| (0,2,0,0) | (1,3,1,1) | (0,0,0,2) | (1,1,1,3) |
| (2,0,2,2) | (3,1,3,3) | (2,2,2,0) | (3,3,3,1) |
| (0,2,2,2) | (1,3,3,3) | (0,0,2,0) | (1,1,3,1) |

From a review of all of the cosets, it will be appreciated that each coset is presented as a group of four columns, each column having vectors of the form:

| | | | |
|---|---|---|---|
| (a, | b, | c, | d) |
| (a + 2, | b + 2, | c, | d) |
| (a, | b, | c + 2, | d + 2) |
| (a + 2 | b + 2 | c + 2, | d + 2) |

With the constellation C being broken into sixteen non-overlapping subconstellations each of whose eight-dimensional points (vectors) are represented by sixteen representative vectors (where each collection of sixteen representative vectors is a coset G+w), a determination can be made as to the squared Euclidean distance between a received eight-dimensional signal vector $(z_1, z_2, z_3, z_4)$ and the vectors of each subconstellation represented by cosets G+w. The branch metric algorithm for making such a determination comprises first determining the squared Euclidean distance between the received vector $(z_1, z_2, z_3, z_4)$ (as corrupted by noise and other impairments) and $T(a) \times T(b) \times T(c) \times T(d)$. This squared Euclidean distance is determinable as the squared Euclidean distance from $(z_1, z_2, z_3, z_4)$ to $T(k)$ and may be obtained from a look-up table which takes the form

| | | | |
|---|---|---|---|
| $m_1(0)$ | $m_2(0)$ | $m_3(0)$ | $m_4(0)$ |
| $m_1(1)$ | $m_2(1)$ | $m_3(1)$ | $m_4(1)$ |
| $m_1(2)$ | $m_2(2)$ | $m_3(2)$ | $m_4(2)$ |
| $m_1(3)$ | $m_2(3)$ | $m_3(3)$ | $m_4(3)$ | where the values of $m_i(k)$ were preferably previously generated according to known techniques. More particularly, each $m_i(k)$ is the squared Euclidean distance from $z_i$ (the received point in the plane i) to the closest point in the set $T(k)$.

In accord with the branch metric algorithm, the following distances are computed: $m_1(\alpha) + m_2(\beta)$; $m_1(\alpha+2) + m_2(\beta+2)$; $m_3(\gamma) + m_4(\delta)$; and $m_3(\gamma+2) + m_4(\delta+2)$, where $\alpha$ and $\gamma$ may take the values zero and one, and $\beta$ and $\delta$ may take the values from zero to three inclusive. Since $\alpha$ may take only two different values and $\beta$ may have four different values, it will be appreciated that each of the four listed distances actually provides eight different values.

Further in accord with the branch metric algorithm of the invention, for each value of $\alpha$ and $\beta$, the distance computed for $m_1(\alpha)+m_2(\beta)$ is compared to the distance computed for $m_1(\alpha+2)+m_2(\beta+2)$ to determine the smaller of the two. Hence, by conducting eight comparisons, a first group of eight shorter distances is obtained. Likewise, for each value of $\gamma$ and $\delta$, the distance computed for $m_3(\gamma)+m_4(\delta)$ is compared to the distance computed for $m_3(\gamma+2)+m_4(\delta+2)$ to determine the smaller of the two. Hence, by conducting eight more comparisons a second group of eight shorter distances is obtained.

With eight determined shorter distances defined for the first two planes (coordinates), and eight determined shorter distances defined for the second two planes, it will be appreciated that sixty-four combinations of the shorter distances for a four coordinate (eight-dimensional) vector may be had. Because each subconstellation is represented by sixteen representative vectors, and because those representative vectors are arranged in groups of four according to the form previously described (i.e. offsets in the first and second planes (coordinates) only, offsets in the third and fourth planes only, and offsets in all four planes), only one of each group of four representative vectors will be in the group of sixty-four combinations. Indeed, for each collection of sixteen representative vectors, there will be exactly four representative vectors which are in the group of sixty-four shortest vectors. Thus, for each of the sixteen subconstellations, comparisons are made between the four vectors previously found to be the shortest, so as to determine the smallest among the four. To compare four vectors, three comparisons are required. Hence, an additional forty-eight comparisons (three for each group of sixteen) beyond the original sixteen comparisons are required in finding the four-coordinate representational vector for each subconstellation which gives the distance between the subconstellation and the received vector $(z_1,z_2,z_3,z_4)$. The provided method therefore requires only sixty-four comparisons to be made in finding the distance from the received eight-dimensional vector to each of the sixteen subconstellations.

Once a determination is made for each subconstellation as to the representative four-coordinate vector which represents that eight-dimensional point (vector) in the subconstellation which is closest to the received signal vector, a determination as to which point of the many points represented is the actual closest point is elementary. That is because the closest point will be the four-coordinate (eight-dimensional) point comprised of each two-dimensional point which is closest to the received two-dimensional point (one coordinate of the received vector) in each of four planes.

Turning to FIG. 1, a block diagram of the branch metric algorithm of the invention is seen. As a starting point for the algorithm, certain values must be known. Thus, at 15, a look-up table of distances from the each of the two-dimensional coordinates of the eight-dimensional received signal vector $(z_1,z_2,z_3,z_4)$ to the closest point in each of the point sets T(0) through T(3) is obtained or provided. For purposes herein, the distances are considered inputs into the preferred method invention. Likewise, at 25, sixteen collections of sixteen representational vectors for representing the four-coordinate vectors of the subconstellation are obtained or provided. Again, these collections are considered inputs into the preferred method invention. Thus, at 30, the branch metric algorithm of the invention starts by computing thirty-two two-component distances $m_1(\alpha)+m_2(\beta)$; $m_1(\alpha+2)+m_2(\beta+2)$; $m_3(\gamma)+m_4(\delta)$; and $m_3(\gamma+2)+m_4(\delta+2)$, where $\alpha$ and $\gamma$ may take the values zero and one, and $\beta$ and $\delta$ may take the values from zero to three inclusive. As indicated in FIG. 1, the each of the thirty-two distances are computed by adding two distances which are provided from the look-up table set forth at 15.

After computing the thirty-two distances at 30, eight of the distances $m_1(\alpha)+m_2(\beta)$ are compared with respectively related eight other distances $m_1(\alpha+2)+m_2(\beta+2)$, while an additional eight distances $m_3(\gamma)+m_4(\delta)$, are compared to their respective related distances $m_3(\gamma+2)+m_4(\delta+2)$ at 40 to obtain two groups of eight two-coordinate vectors representing shorter distances. Then, at 50 the two components of the first group of eight shorter distances are combined with the two components of the second group of eight shorter distances to provide sixty-four four-component representative vectors. Of the sixty-four four-component representative vectors, four such representative vectors are found in each of the sixteen collections obtained at 25.

With the sixteen groups of four four-component representative vectors, comparisons are made at 60 for each group between the four four-coordinate representative vectors of that group. Thus, the output of 60 is sixteen representative four-coordinate vectors which represent a plurality of four-coordinate vectors in each subconstellation, one of which is the four-coordinate vector which is the closest to the received four-coordinate signal vector for each particular subconstellation.

There has been described and illustrated herein a branch metric algorithm which determines distances between a received eight-dimensional vector having four two-dimensional coordinates and each of sixteen non-overlapping subconstellations which are each represented by a collection of sixteen representational vectors. While a particular embodiment of the invention has been described, it is not intended that the invention be limited thereby as it is intended that the invention be broad in scope and that the specification be read likewise. Thus, for example, while the invention was described in terms of using squared Euclidean distances, other planar distance functions can be utilized provided that resulting distance functions between vectors with planar coordinates are obtained by summing coordinate by coordinate. Also, while in the preferred embodiment of the invention, the set T(0) is comprised of a plurality of points, those skilled in the art will appeciate that for particular circumstances T(0) can consist of a single point. Therefore, it will be apparent to those skilled in the art that additional modifications can be made to the described invention without deviating from the scope of the invention as so claimed.

We claim:

1. A method for determining indications of the distances between a received eight-dimensional vector having four two-dimensional coordinates and each of sixteen non-overlapping subconstellations, comprising:
   (a) obtaining indications of distances between each of said two-dimensional coordinates of said received vector and a first set of points in a two-dimensional plane, and between each of said two-dimensional coordinates of said received vector and non-overlapping second, third, and fourth sets of points generated by ninety, one hundred eighty and two hundred seventy degree rotations of said first set of points, wherein each of said sixteen non-overlapping subconstellations is represented by a collection of sixteen representational four-coordinate vectors, wherein an i'th coordinate of one of said four-coordinate representational vectors represents one of said four non-overlapping sets of points in an i'th plane, and wherein for any representational four-coordinate vector representing a particular subconstellation, said representational vectors which represent one hundred and eighty degree rotations in a first and second two-dimensional coordinate and zero rotation in a third and fourth two-dimensional coordinate, zero rotation in said first and second two-dimensional coordinate and one hundred eighty degree rotation in said third and fourth two-dimensional coordinates, and one hundred eighty degree rotation in all said four two-dimensional coordinates are also representative of said particular subconstellation;

(b) using said obtained indications of distance for said two-dimensional coordinates to find an indication of distance between a first four-dimensional vector consisting of the first two two-dimensional coordinates of said received eight-dimensional vector and each of sixteen four-dimensional sets of points represented by sixteen two-coordinate representational vectors wherein a first coordinate represents one of said nonoverlapping sets of points in a first two-dimensional plane and wherein a second coordinate represents one of said nonoverlapping sets of points in a second two dimensional plane, and obtaining by comparison the smaller of two distance indications in each of eight pairs of distance indications to obtain a first group of eight shorter distances, each pair comprising the distance indication between said first four-dimensional vector and a particular of said four-dimensional set of points and the distance indication between said first four-dimensional vector and a set of four-dimensional points which is a hundred-eighty degree rotation of said particular four-dimensional set of points;

(c) using said obtained indications of distance for said two-dimensional coordinates to find an indication of distance between a second four-dimensional vector consisting of the second two two-dimensional coordinates of said received eight-dimensional vector and each of a second collection of sixteen four-dimensional sets of points represented by a second collection of sixteen two-coordinate representational vectors wherein a first coordinate of said second four-dimensional vector represents one of said nonoverlapping sets of points in a third two-dimensional plane and wherein a second coordinate of said four-dimensional vector represents one of said nonoverlapping sets of points in a fourth two-dimensional plane, and obtaining by comparison the smaller of two distance indications in each of a second group of eight pairs of distance indications to obtain a second group of eight shorter distances, each pair comprising the distance indication between said second four-dimensional vector and a particular one of said second collection of four-dimensional sets of points and the distance indication between said second four-dimensional vector and a set of four-dimensional points which is a hundred-eighty degree rotation of said particular one of said second collection of four-dimensional sets of points;

(d) for each said collection of sixteen four-coordinate representational vectors, finding four representational four-coordinate vectors comprised of a combination of first and second two-dimensional coordinates from said first group of shorter distance indications, and third and fourth two-dimensional coordinates from said second group of shorter distance indications; and (e) for each said collection of sixteen four coordinate representational vectors, comparing among four distance indications from said received vector to the eight-dimensional set of subconstellation points represented by each of said four found four-coordinate representational vectors, to determine a shortest distance indication between said received vector and each subconstellation.

2. A method according to claim 1, wherein:
each distance indication is a squared Euclidean distance.

3. A method according to claim 2, wherein:
each distance indication between vectors having more than one coordinate is a square Euclidean distance obtained by adding squared Euclidean distances found in each relevant plane.

4. A method according to claim 3, wherein:
one of said sixteen collections of representational four-coordinate vectors is a closed set under addition and subtraction.

5. A method according to claim 4, wherein:
said collection of four coordinate vectors closed under addition and subtraction is closed mod 4 and consists of the representational vectors

| (0,0,0,0) | (1,1,1,1) | (0,2,0,2) | (1,3,1,3) |
| (2,2,0,0) | (3,3,1,1) | (2,0,0,2) | (3,1,1,3) |
| (0,0,2,2) | (1,1,3,3) | (0,2,2,0) | (1,3,3,1) |
| (2,2,2,2) | (3,3,3,3) | (2,0,2,0) | (3,1,3,1) | wherein each number 0, 1, 2, and 3 represents a different set of points, each set of points being related by the rotatation of a first set of points by said number times ninety degrees.

6. A method according to claim 1 wherein:
one of said sixteen collections of representational four-coordinate vectors is a closed set under addition and subtraction.

7. A method according to claim 6 wherein:
said collection of four-coordinate vectors closed under addition and subtraction is closed mod 4 and consists of the representational vectors

| (0,0,0,0) | (1,1,1,1) | (0,2,0,2) | (1,3,1,3) |
| (2,2,0,0) | (3,3,1,1) | (2,0,0,2) | (3,1,1,3) |
| (0,0,2,2) | (1,1,3,3) | (0,2,2,0) | (1,3,3,1) |
| (2,2,2,2) | (3,3,3,3) | (2,0,2,0) | (3,1,3,1) | wherein each number 0, 1, 2, and 3 represents a different set of points, each set of points being related by the rotatation of a first set of points by said number times ninety degrees.

8. A method according to claim 1, wherein:
said sixteen four-dimensional sets of points represented by sixteen two-coordinate representational vectors, and said second collection of sixteen four-dimensional sets of points represented by a second collection of sixteen two-coordinate representational vectors are identical and consists of a combination of sets $T(k) \times T(k)$, where k can vary from zero to three, and where $T(k)$ represents a set of points, wherein each number 0, 1, 2, and 3 represents a different set of points, each set of points being related by the rotatation of a first set of points by said number times ninety degrees.

9. A method according to claim 1, further comprising:
(e) from said shortest distance indication between said four-coordinate received vector and said four-coordinate representative vector, for each of said sixteen subconstellations, determining which four-coordinate vector in each subconstellation is closest to said four-coordinate received vector.

10. A method for determining indications of the distances between a received eight-dimensional vector $(z_1,z_2,z_3,z_4)$ having four planar coordinates $z_1$, $z_2$, $z_3$, and $z_4$ and each of sixteen non-overlapping subconstellations, comprising:
(a) obtaining metrics between each of said $z_1$, $z_2$, $z_3$, and $z_4$ and sets $T(0)$, $T(1)$, $T(2)$, and $T(3)$ in a plane, where $T(1)$, $T(2)$, and $T(3)$ are ninety, one hundred-eighty, two hundred-seventy degree rotations of $T(0)$ respectively, and wherein each of said subconstellations is formed by the union of sixteen cartesian products $T(a) \times T(b) \times T(c) \times T(d)$, wherein
each said cartesian product is represented by the four coordinate representational vector $(a,b,c,d)$,
each of said sixteen non-overlapping subconstellations is represented by a collection of sixteen representational four coordinate vectors $(a,b,c,d)$ with a, b, c, and d ranging from zero to three inclusive, and if $(a,b,c,d)$ represents a particular subconstellation then so do $(a+2,b+2,c,d)$, $(a,b,c+2,d+2)$, and $(a+2,b+2,c+2,d+2)$;
(b) using said obtained metrics to find a four-dimensional metric between $(z_1,z_2)$ and $T(a) \times T(b)$ which equals the metric between $z_1$ and $T(a)$ plus the metric between $z_2$ and $T(b)$, for each of sixteen sets $T(a) \times T(b)$, and obtained by comparison the smaller of two four-dimensional metrics in each of eight pairs of four-dimensional metrics to obtain a first group of eight shorter four-dimensional metrics, each pair comprising a four-dimensional metric between $(z_1,z_2)$ and $T(a) \times T(b)$ and a four-dimensional metric between $(z_1,z_2)$ and $T(a+2) \times T(b+2)$;
(c) using said obtained metrics to find a four-dimensional metric between $(z_3,z_4)$ and $T(c) \times T(d)$ which equals the metric between $z_3$ and $T(c)$ plus the metric between $z_4$ and $T(d)$, for each of sixteen sets $T(c) \times T(d)$, and obtaining by comparison the smaller of two four-dimensional metrics in each of eight pairs of four-dimensional metrics to obtain a second group of eight shorter four-dimensional metrics, each pair comprising a four-dimensional metric between $(z_3,z_4)$ and $T(c) \times T(d)$ and a four-dimensional metric between $(z_3,z_4)$ and $T(c+2) \times T(d+2)$;
(d) for each said collection of sixteen four-coordinate representational vectors, finding four representational four-coordinate vectors comprised of a combination of first and second planar coordinates from said first group of shorter four-dimensional matrics, and third and fourth planar coordinates from said second group of shorter four-dimensional metrics, wherein an eight-dimensional metric for said found four-coordinate vector equals said four-dimensional metric of said first group for its first two planar coordinates plus said four-dimensional metric of said second group for its second two planar coordinates; and
(e) for each said collection of sixteen four-coordinate representational vectors, comparing eight-dimensional metrics from said received vector to a particular subconstellation represented by said four found representational vectors, to determine a smallest eight-dimensional metric between said received vector and said particular subconstellation.

11. A method according to claim 10, wherein:
each said metric is a squared Euclidean distance.

12. A method according to claim 11, wherein:
each metric between vectors having more than one coordinate is a square Euclidean distance obtained by adding squared Euclidean distances found in each relevant plane.

13. A method according to claim 12, wherein:
one of said sixteen collections of representational four-coordinate vectors is a closed set under addition and subtraction.

14. A method according to claim 13, wherein:
said collection of four coordinate vectors closed under addition and subtraction is closed mod 4 and consists of the representational vectors

| | | | |
|---|---|---|---|
| (0,0,0,0) | (1,1,1,1) | (0,2,0,2) | (1,3,1,3) |
| (2,2,0,0) | (3,3,1,1) | (2,0,0,2) | (3,1,1,3) |
| (0,0,2,2) | (1,1,3,3) | (0,2,2,0) | (1,3,3,1) |
| (2,2,2,2) | (3,3,3,3) | (2,0,2,0) | (3,1,3,1) | wherein numbers 0, 1, 2, and 3 respectively represent sets of points $T(0)$, $T(1)$, $T(2)$, and $T(3)$.

15. A method according to claim 10 wherein:
one of said sixteen collections of four-coordinate vectors is a closed set under addition and subtraction.

16. A method according to claim 15, wherein:
said collection of four-coordinate vectors closed under addition and subtraction is closed mod 4 and consists of the representational vectors

| | | | |
|---|---|---|---|
| (0,0,0,0) | (1,1,1,1) | (0,2,0,2) | (1,3,1,3) |
| (2,2,0,0) | (3,3,1,1) | (2,0,0,2) | (3,1,1,3) |
| (0,0,2,2) | (1,1,3,3) | (0,2,2,0) | (1,3,3,1) |
| (2,2,2,2) | (3,3,3,3) | (2,0,2,0) | (3,1,3,1) | wherein numbers 0, 1, 2, and 3 respectively represent sets of points $T(0)$, $T(1)$, $T(2)$, and $T(3)$.

17. A method according to claim 10, further comprising:
(e) from said shortest metric between said four-coordiate received vector and said four-coordinate representative vector, for each of said sixteen subconstellations, determining which four-coordinate vector in each subconstellation is closest to said four-coordinate received vector.

* * * * *